June 6, 1967
R. BAGGIO ETAL
3,324,282
FUNCTION COMPUTER
Filed Nov. 8, 1965
5 Sheets-Sheet 5
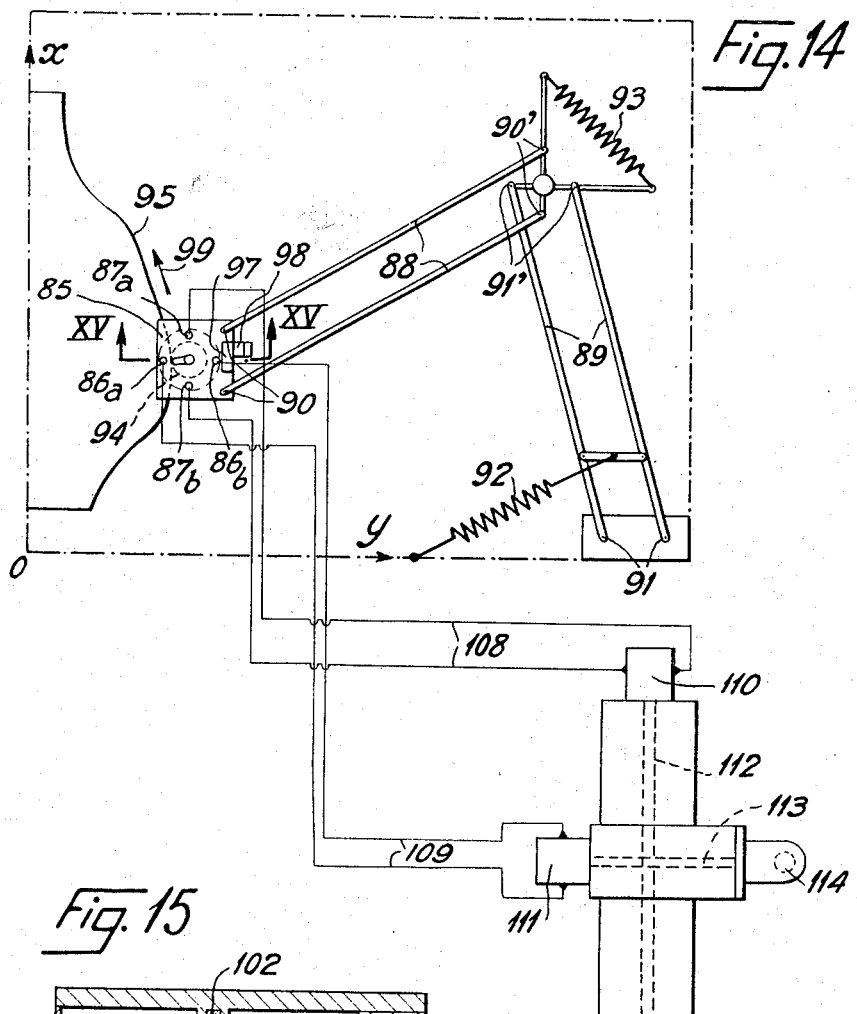
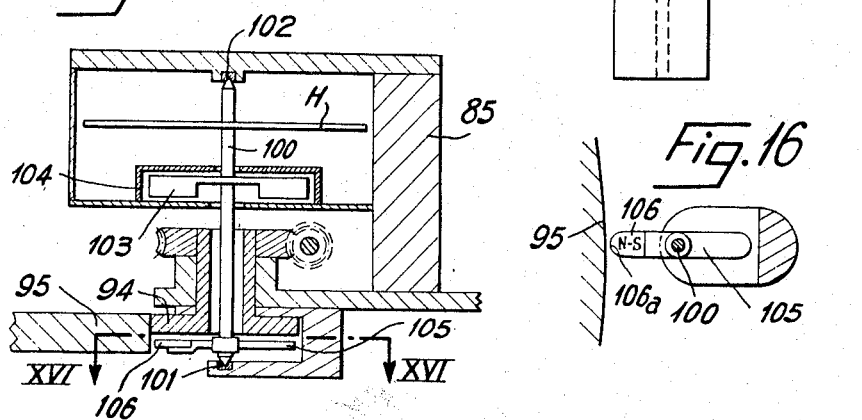
Inventors
Raphaël Baggio
Edmond M. M. E. Voillaume
Stevens, Davis, Miller & Mosher
Attorneys

United States Patent Office 3,324,282
Patented June 6, 1967

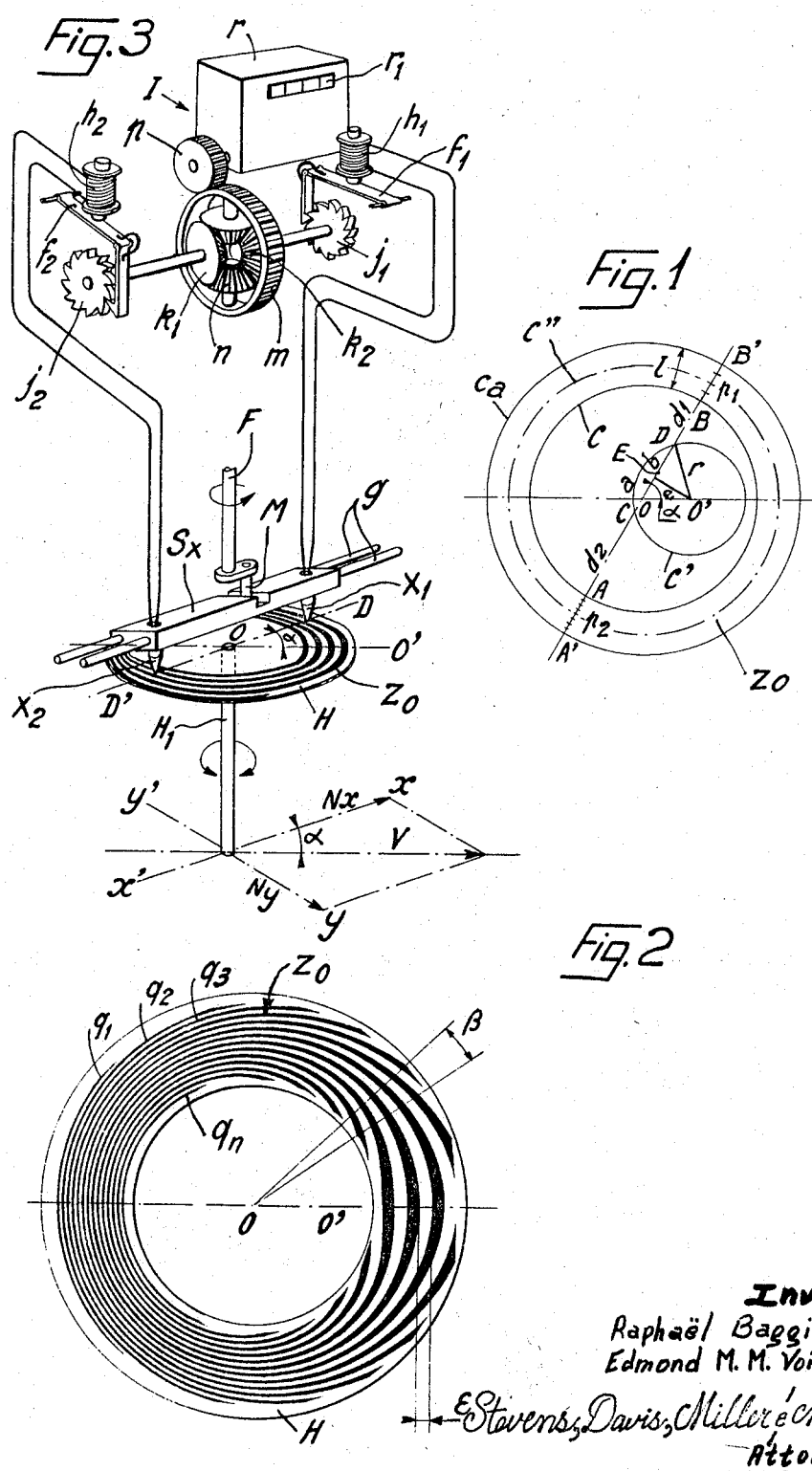

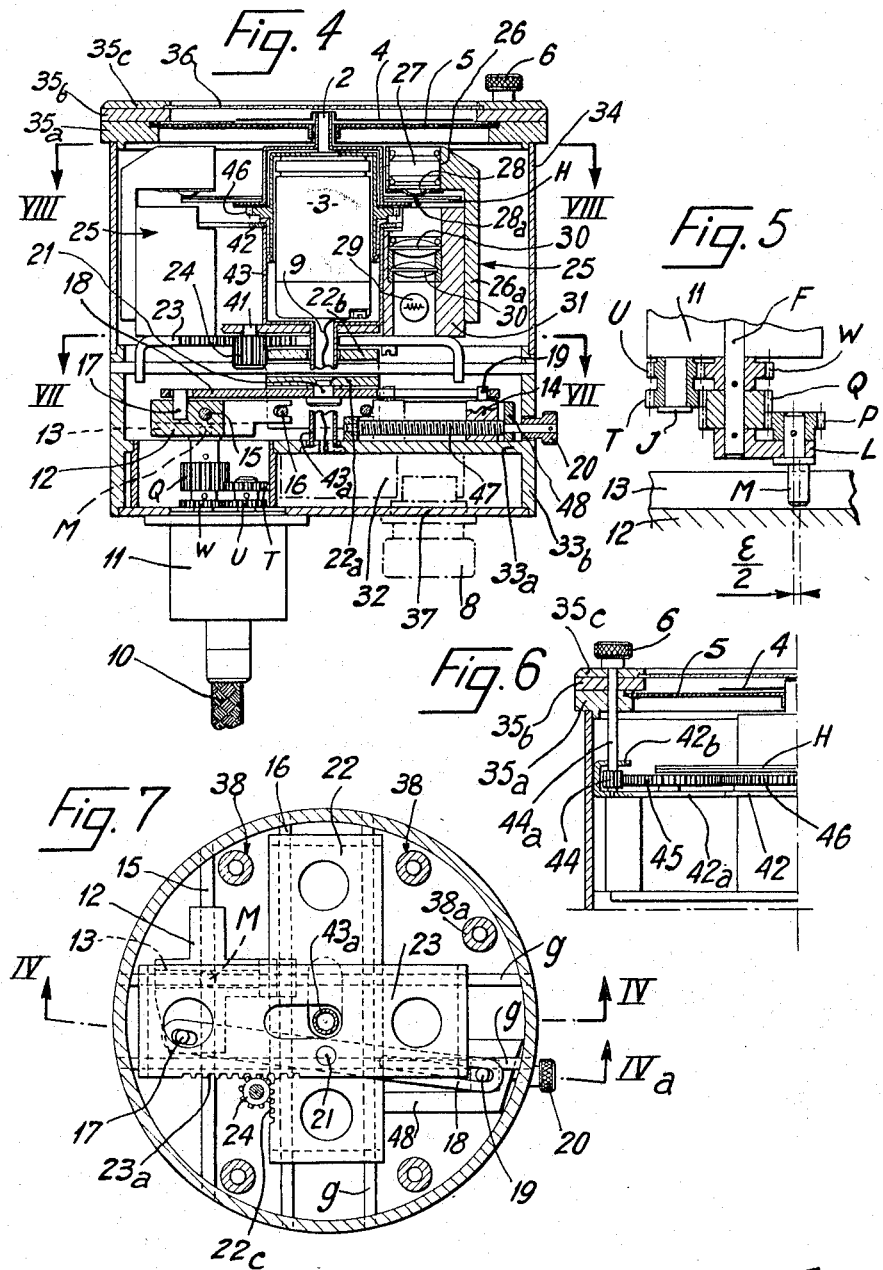

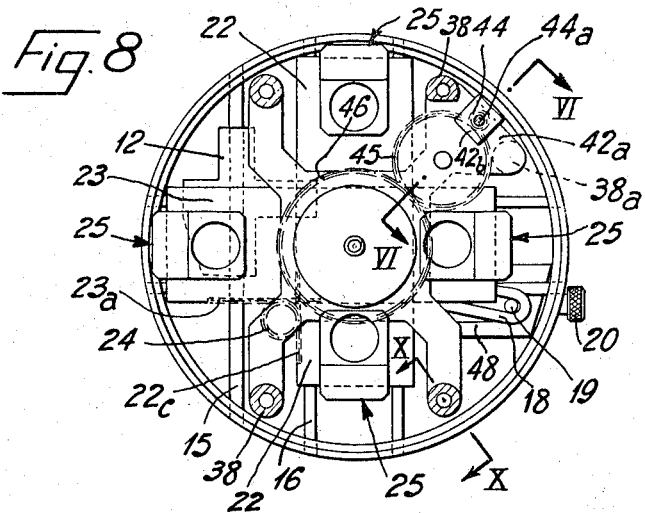
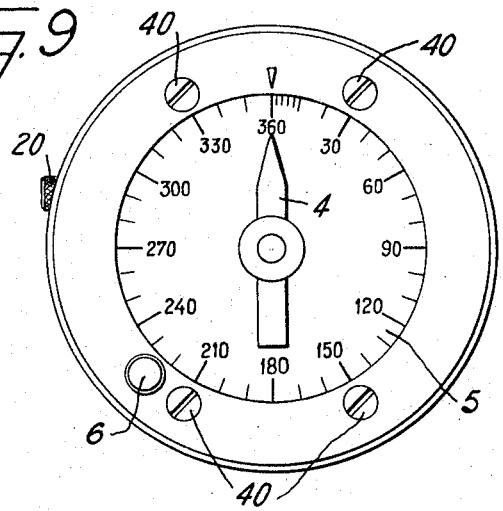
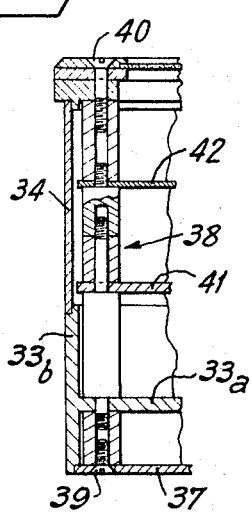

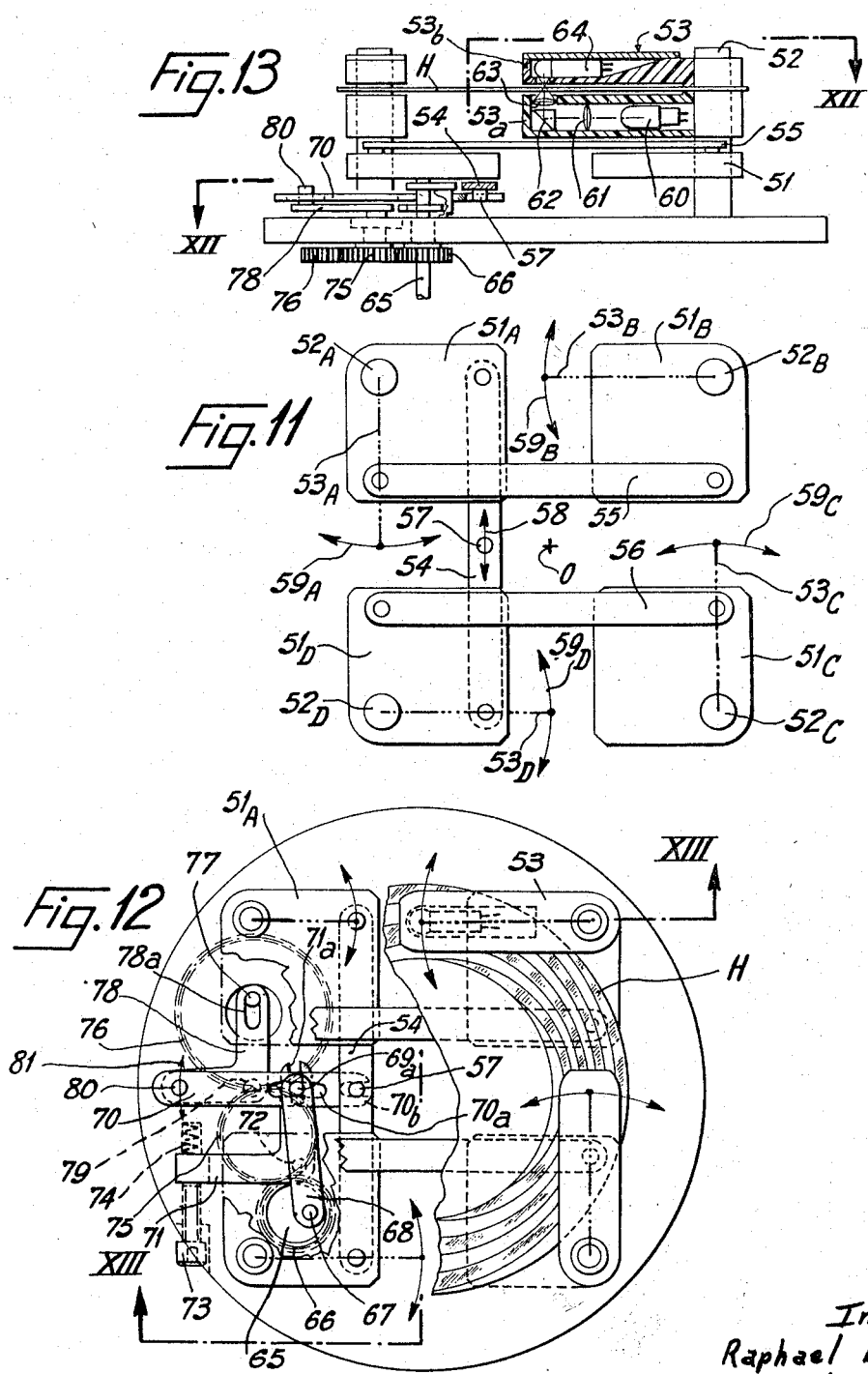

3,324,282
FUNCTION COMPUTER
Raphaël Baggio, Versailles, and Edmond M. M. E. Voillaume, Paris, France, assignors to American Bosch Arma Corporation, Garden City, N.Y., a corporation of New York
Filed Nov. 8, 1965, Ser. No. 506,824
Claims priority, application France, Nov. 17, 1964, 995,214
23 Claims. (Cl. 235—61.6)

The generation of the values of angular, specifically trigonometric functions, especially the cosine and sine functions, is important in many fields of engineering, as for monitoring the position of a rotatable shaft in the automatic control of machine-tools and other apparatus, in navigational systems for the guidance of vehicles and craft, and for various other purposes.

This invention relates to analogue function computing systems of the type involving the generation of trigonometric and other angular functions in which said functions are generated by means of a suitable pattern formed on a revolving support, such as a drum or disk, with which is associated a senser of appropriate character, such as a photoelectric cell in which case the pattern would comprise alternate opaque and clear markings. The pattern is arranged to represent values of the desired function in some suitable code, so that as the senser is reciprocated past the pattern along a scanning path, it will scan the markings representative of the particular value of said function that corresponds to the instant angular position of the rotatable pattern-support. The electrical output of the senser then represents said particular function value, and can be exploited in any of various ways.

It is a primary object of this invention to provide apparatus for the general purpose above specified, which will be capable of greatly enhance precision.

A further object is to provide apparatus for readily and accurately computing any desired function of the general form $y = vf(\alpha)$, where $v$ is a scaler quantity and $f(\alpha)$ is a specified function involving the trigonometric functions of the angle $\alpha$.

The invention is based on a mathematical concept which, to the best of applicants' knowledge, has not been put to any practical use heretofore. This concept can be set out as follows.

Considering a straight line rotated in a plane about a center situated on the line, it is always possible to determine analytically (conveniently in polar coordinates) a curve such that the difference between the lengths of the vector radii defined by the intersections of said line with two diametrically opposed points of the curve, is expressed as an arbitrarily selected function of the trigonometric functions of the angular position of the line.

If for example the selected function is the cosine or sine function, such curve may be a circumfereence surrounding the center of rotation in excentric relation thereto.

Having determined such curve, there can be plotted a pattern consisting of a family of nested curves surrounding the center, such that the difference in density of said curves (i.e. in the number of curves encountered per unit radial length), as between two diametrically opposed regions of an annular zone surrounding the center, will represent said difference of the vector radii and hence said selected function. The above will be clarified later in respect to an example relating to the cosine function.

In these conditions, a pair of (e.g. photo-electric) scanners reciprocated to scan diametrically opposite regions of the said annular zone, will produce respective numbers of pulses, so related that their difference will represent the particular value of said selected function corresponding to the angle between the scanning line, and a reference direction of said annular zone. These output pulses can then, according to the invention, be applied to respective inputs of a differential device of any suitable type, which will thus provide an indication of the said value of the selected function.

It will be seen that one feature radically distinguishing the angular function computor of the invention from conventional devices having a generally similar purpose, resides in the differential character inherent to the method used, and which in turn entails the use of differential type output instrumentalities in the apparatus of the invention. An important advantage of such a differential method is the following: the scanning amplitude of both scanners may be varied or chosen arbitrarily the difference in number of pulses always represents the values of the function $f(\alpha)$ at an appropriate scale. Moreover the method provides automatically reverse values (positive and negative) for the function $f(\alpha)$ according to the values $\alpha$ and $\pi + \alpha$ i.e. when the straight line making the angle $\alpha$ with the reference direction is described in one direction or the other one. A further desirable feature lies in the particular character of the output from the scanners of the invention, which is in the form of variable numbers of pulses which can conveniently be applied directly to pulse operated stepping motors, without requiring any intermediate conversion step.

According to a further feature of the invention, the angular function $f(\alpha)$ computed in the manner outlined above, can easily be multiplied by a variable quantity $(v)$, by the simple expedient of correspondingly varying the number of reciprocation of the scanners.

Another object of the invention is to increase accuracy of the computing by periodically varying either the scanning amplitude or the origin of the scanning by staggered increments. A further increase in accuracy may be obtained according to the invention by varying the said periodic variation in scanning over a long-term cycle. Hence the average value of $f(\alpha)$ for a given value of $(\alpha)$ is all the more accurate as the variable quantity $(v)$ corresponds to a larger number of scannings.

Objects of this invention further include the provision of apparatus based on the principles summarized above, which will constitute navigational data computers and guidance units for craft and vehicles. For example, when such a unit is installed aboard a land vehicle, the annular support having the pattern representative of the cosine function formed thereon can be held in a fixed orientation with respect to Earth coordinates by way of a conventional directional follow-up loop from a suitable directional reference such as a directional gyro or an earth-inductor. Two pairs of scanners are associated with said annular support, arranged to scan mutually orthogonal diameters of the pattern. The rate of reciprocation of both sets of scanners is varied in dependency on the linear velocity of the vehicle, e.g. by means of a tachometer take-off. The system will then at all times indicate with great accuracy the positional coordinates and the bearing of the vehicle.

Another specific object is to provide apparatus based on the principle outlined above for controlling the motion of a mechanical part, such as a machine-tool cutting head, in accordance with a selected contour. In this application, the support carrying the director pattern of nested curves would be displaced along the contour, while being at all times maintained in fixed orientation with respect to the tangent to the contour, e.g. by magnetic attraction. The pairs of orthogonally related scanners would, on the other hand, be constrained to retain fixed directions with respect to reference coordinates in the plane of motion, throughout the displacement of the said support.

Exemplary embodiments of the invention will now be described with reference to the accompanying drawings, wherein:

FIG. 1 is a geometric diagram used to explain the principle on which the invention is based;

FIG. 2 shows an annular pattern of opaque and clear bands, as derived from an application of the principle explained with reference to FIG. 1, and used for the generation of the sine and cosine functions in apparatus according to the invention;

FIG. 3 is a schematic isometric view, illustrating the general operation of an apparatus according to the invention embodying the pattern disk of FIG. 2;

FIGS. 4–10 are detailed views of an embodiment of the invention used as a navigational data computer and guidance unit aboard a vehicle. Of these figures, FIG. 4 is an axial section on line IV—IV of FIG. 7 and partly line IVa—IVa of FIG. 7 more clearly to show a detail in the central part of the apparatus;

FIG. 5 shows a detail of FIG. 4 on an enlarged scale, and inverted with respect to the showing of FIG. 4;

FIG. 6 is a radial section on line VI—VI of FIG. 8;

FIGS. 7 and 8 are sections on lines VII—VII and VIII—VIII of FIG. 4;

FIG. 9 is an overhead view of FIG. 4; and

FIG. 10 is a radial section on line X—X of FIG. 8;

FIGS. 11–13 illustrate another embodiment of part of an apparatus according to the invention; in these figures, FIG. 11 is a simplified view in plan, with parts omitted or shown schematically, serving to explain the kinematics of the coupling linkages;

FIG. 12 is a plan view, with parts broken away, and in section on line XII—XII of FIG. 13; and FIG. 13 is a section on line XIII—XIII of FIG. 12.

FIGS. 14–16 illustrate schematically a further embodiment of the invention as applied to the control system of a copying machine-tool; herein FIG. 14 is a general view of the lay-out in plan;

FIG. 15 is a section on line XV—XV of FIG. 14, on an enlarged scale; and

FIG. 16 is a section on line XVI—XVI of FIG. 15.

The mathematical concept on which this invention is based will first be clarified through the showing of the manner in which the function $\cos \alpha$ can be generated as a difference between two quantities representable as the numbers (or densities) of a family of nested curves, intersected by diametrically opposed sections of a common, rotating line or vector radius.

Referring first to the diagram of FIG. 1, consider the two circumferences $c$ and $c'$, respectively having the centers O and O' and having the radii R and $r$, with the second circumference being inside the first as shown.

A straight line drawn through the center O at an angle $\alpha$ to the center line OO' intersects circumference $c$ at points A and B and intersects circumference $c'$ at points C and D. If the perpendicular O'E to line AB is drawn from point O', then the following relations obtain wherein $d_1 = |DB|$, $d_2 = |AC|$, $a = |OE|$ and $b = |ED|$:

$$d_1 = |OB| - |OD| = R - b - a$$
$$d_2 = |OA| - |OC| = R - b + a$$

Further putting $$|OO'| = \frac{k}{2}$$

(a constant), we can write $$d_2 - d_1 = 2a = k \cos \alpha \quad (1)$$

The above relation (1) states that the difference between the segments AC and DB defined on line AB by the annular space between the eccentric circumferences $c$ and $c'$, is proportional to the cosine of the angle $\alpha$ formed between line AB and the center line OO'. Therefore, said difference $d_2 - d_1$ is a measure, to an appropriate scale, of the unit vector along the center line as projected on the diameter AB, or alternatively a measure of the unit vector along diameter AB, as projected on center line OO'. As will be evident, relation (1) holds independently of the value of radius R which can be arbitrarily chosen as may be convenient.

As a next step, we consider a transformation wherein the non-uniform annular space defined between the eccentric circumferences $c$ and $c'$ is transformed into an annular space of uniform width ZO defined between two concentric circumferences as shown in FIG. 2. For this purpose, on every radial line through the common center O, the segment of said line defined between the two concentric circumferences is divided into a number of divisions proportional to the corresponding width of the non-uniform annular space.

For convenience, the two concentric circumferences are represented in FIG. 1 as $c$ and $C_a$ and the uniform-width annular zone ZO between them is considered as the transform of the non-uniform annular zone between $c$ and $c'$, according to the above-defined transformation. The segments BB' defined on the radial line AB beyond point B is divided into $n_1$ divisions each of length $p_1$ and the segment AA' defined on line AB beyond point A is divided into $n_2$ divisions each of length $p_2$ such that $$p_1 = \frac{1}{2k'd_1}, \quad p_2 = \frac{1}{2k'd_2} \quad (2)$$

and $$n_1 = 2k'd_1, \quad n_2 = 2k'd_2 \quad (3)$$

where 1 is the width of the uniform annular zone ZO, $d_1$ and $d_2$ have the meanings precedingly given, and $k'$ is an arbitrary constant.

In FIG. 1, $c''$ designates an intermediate circumference concentric with and equidistant from $c$ and $c_a$, to either side of which the divisions are marked.

By the above method it will be seen that around the entire annular zone ZO, there are produced a variable number of transverse (radial) divisions, said number being varied continuously around the circumference of the zone and being a maximum on the center line OO' on that side where the non-uniform annular space was widest, and a minimum on the center line on that side where the non-uniform annular space was narrowest.

Joining the corresponding points of division along all of the radial segments, there is obtained a set of nesting curves. If alternate intervals between the curves of the set are made opaque or blackened, there is obtained a grid including opaque bands such as $q_1, q_2 \ldots q_n$ covering the annular zone ZO. Intermediate ones of these bands are closed loops whereas innermost and outermost ones of the bands are C-shaped or open loops.

Considering now a physical embodiment of the invention shown in FIG. 3, the pattern just described with reference to FIG. 2 is carried upon a disk H secured on a rotatable shaft $H_1$ herein shown vertical. Mounted for sliding reciprocation above the disk H in a direction parallel to a diameter of the disk is a strip member $Sx$ slidingly mounted on a pair of parallel stationary guide rails $g$. The strip $Sx$ has a pair of photoelectric cell elements $X_1$ and $X_2$ supported from its under side so as to scan diametrically opposite regions of the annular zone ZO formed on the disk H. The photocell carrier strip $Sx$ is shown driven in recipriation from a rotatable shaft F, aligned with shaft $H_1$, by way of a crankpin M carried at one end of shaft F and engaging a transverse slot in the strip $Sx$, as shown.

With the disk H illuminated from below from any suitable light source not shown, it will be understood that each of the photocells $X_1$, $X_2$ will deliver an electric voltage pulse across a pair of conductors connected to it, whenever the photocell, during its diametric scanning reciprocation, moves past the boundary between an opaque and a clear band of the pattern present on rotating disk H.

Differential counter means, generally designated I, are provided for indicating the difference between the numbers of pulses delivered by the two photocells $X_1$ and $X_2$ over any given period of time. The differential counter device, is here shown by way of example as being of an electromechanical type including a pair of electromagnet windings $h_1$ and $h_2$ having the outputs of photocells $X_1$ and $X_2$ respectively applied to them. On application of a voltage pulse, each electromagnet $h_1$, $h_2$ attracts a vane armature $f_1$, $f_2$ which has a ratchet pawl member pivoted to an end of it, the pawl engaging a ratchet wheel $j_1$, $j_2$. Thus each ratchet wheel advances one step in rotation on application of a voltage pulse to the associated electromagnet. As shown in the drawing, the vane armatures $f_1$ and $f_2$ are so mounted as to rotate the respective ratchets $j_1$ and $j_2$ in opposite directions about a common axis of rotation. It will be observed that the windings $h_1$, $h_2$ and associated armatures and pawl-and-ratchet mechanisms constitute a form of pulse-operated stepping motor. Other equivalent pulse-operated motors may be used. The coaxially mounted shafts carrying the ratchets $j_1$ and $j_2$ have opposite sungears $k_1$ and $k_2$ secured to them, the sungears forming part of a conventional differential gear train which further includes the planetaries $n$ meshing with both sungears, and a planetary-carrier formed with a peripheral gear annulus $m$. Meshing with gear annulus $m$ is a pinion $p$ which forms the input gear of a conventional differential counter generally designated $r$.

The differential counter $r$ may be of any suitable and well known type, such as a drum counter, adapted to count in one sense, e.g. up, whenever its input shaft is rotated stepwise by pinion $p$ in one direction, and to count in the reverse sense, i.e. down, for every step of rotation imparted by pinion $p$ to the input shaft in the opposite direction. The net count contained at any time in the counter is indicated as a digital indication displayed in a window $r_1$. Thus, the amount displayed at any instant in the window $r_1$ is the integrated or cumulated count, from a time origin at which the counter was reset up until that instant, of the differences of pulses delivered by the photocells $X_1$ and $X_2$.

Assuming the disk H is stationary and positioned such that the diametric line OO' thereof forms an angle $\alpha$ to the fixed diameter DD' (or O$x$) parallel to the direction of reciprocation of the photoelectric scanners as said direction is fixedly determined by the guide rails $g$, then at each reciprocation, it will be evident that each of the scanners $X_1$ and $X_2$ delivers a series of pulses equal in number to that of the opaque bands of the disk crossed by it during its scanning stroke. Since these numbers are $n_1$ and $n_2$ as given by Equations 3, it is evident that the rotations imparted to the sungears $k_1$ and $k_2$ during every reciprocatory stroke of the scanners, are respectively proportional to said numbers and hence proportional to $d_1$ and $d_2$. Consequently, designating by V the number of turns of the shaft F i.e. the number of reciprocatory cycles performed by the scanners, the numerical indication displayed by the counter unit $r$ will be proportional to the quantity $V \cos \alpha$.

The said indication is seen to represent, with a suitable scale factor, the projected length of a vector of length V along the center line OO' of the disk H, on the fixed axis O$x$ parallel to the direction of reciprocation of the scanner-support S$x$. If the vector of length V whose projected length is to be measured is 2N times the length of the unit vector, a rotation of shaft F by N revolutions will provide a direct indication of said projected length, as a certain number $N_x$ of pulses displayed in counter $r$.

Any suitable means may be provided for driving the shaft F in the ratio of the length of a given vector. More broadly, it will be evident that V may be any variable scalar quantity, not necessarily the length of a particular vector, and that any suitable drive mechanism may be used for converting such quantity into a number of turns of the shaft F.

If, in addition to the pair of scanners $X_1$ and $X_2$ and associated reciprocatory scanning means S$x$, there be provided a second similar scanning arrangement with a second pair of photoelectric scanners mounted for reciprocation on a diameter perpendicular to the scanning diameter of the pair of scanners $X_1$ and $X_2$ shown, and the outputs of said further pair of scanners are applied to a second differential counting arrangement similar to the one shown at I, then it is clear that such second counter will display indications $N_y$ proportional to $V \sin \alpha$. The combined indications of the two counting arrangements, i.e. $N_x$ and $N_y$, are then seen to be proportional to the projections of vector V on a pair of cartesian coordinate axes O$x$ and O$y$.

In the above, the invention has been described as utilized for generating the trigonometric functions $\cos \alpha$ and $\sin \alpha$. While such an application of the invention is particularly valuable in many practical cases as a means of computing the angular and rectangular coordinates of a variable vector, the invention is not limited thereto, and the mathematical principles disclosed above can be readily extended for the computation or generation of other functions. In fact, it can be shown analytically that any of the basic trigonometric functions as well as other angular functions can be represented as a difference $(d_1 - d_2)$ of two segments of a rotating vector radius, defined by a suitably selected curve. A pattern analogous to the one shown in FIGS. 2 and 3 in the case of the cosine and sine functions, can then be constructed by a process analogous to the one described.

To draw the grid representing in the annular zone ZO a function $f(\alpha)$ it is not necessary to draw first the curve materializing the segments $d_1$ and $d_2$. The values $d_1$ and $d_2$ may only be calculated for the different values of the angle $\alpha$. In tabulating the values of $d_1$ and $d_2$ the widths of the broadest and narrowest bands of the pattern can first be selected arbitrarily, then the intermediate values for the widths and numbers of the bands can be determined by interpolation.

The path of reciprocation of the scanner elements $X_1$ and $X_2$ across the pattern is not necessarily effected along a diametric line as shown in FIG. 3, nor is it necessary that said path be rectilinear. The scanners may be reciprocated along circular arcs (as later disclosed). The pattern of opaque and clear lines used according to the invention may itself vary widely in its geometric form. Thus, FIG. 2 is only one illustrative form of a suitable geometric pattern for generating the cosine and sine functions. By varying the parameters the shape of the curves ($q$) may be widely modified, and in a limiting case the opaque and clear bands may be simple radial lines, with the spacing and width of such bands varying continuously around the circumference. In such case, the scanner elements would be reciprocated in a direction generally tangential to the circumferential zone.

It is generally preferable, however, so to arrange matters that the bands have the generally annular configuration shown in FIG. 2, and that the scanners are reciprocated along a direction having a substantial diametric component relative to the annular zone, as shown in FIG. 3. Such a layout is advantageous for several reasons. First, with a generally diametric or radial direction of scan reciprocation, it is evident that the angle $\alpha$ remains constant throughout each scan cycle. Hence the pitch characteristics (i.e. both the width and spacing) of the bands crossed during the scanning cycle is also constant. This facilitates the practical construction of the pattern. Moreover variations in the orientation of the vector ($\alpha$ angle) do not result in any relative displacement of the scanners with respect to the bands in a transverse direction. Such transverse relative displacements would be liable to generate spurious pulses that would introduce errors into the differential counting process.

The function generating or computing process of the invention is capable of very high accuracy, using only a limited number of opaque bands in the pattern, as will be later made clear. In the exemplary pattern shown in FIG. 2, it is seen that the number of bands present across the radial width of the annular zone ZO varies from a minimum number of three (right of the horizontal diameter OO') to a maximum of thirteen (left of said horizontal diameter). As α is varied from zero to 180°, the number of bands ($n_1$) representative of the value $d_1$ is therefore varied from 3 to 13, and concurrently the number of bands $n_2$ representative to $d_2$ is varied from 13 to 3. In these conditions the difference ($d_2-d_1$) can be expressed by means of twenty distinct digital values, as from +10 to −10, and the average accuracy is therefore 180°/20 or 9° per half-revolution of the scanner drive shaft F, or per semi-cycle of the scanning movement. The actual accuracy obtained with the device, however can be made very much higher, by varying the amplitude and/or the central position of the scanner device S$x$ from one scan cycle to the next, by an amount corresponding to not more than the maximum width of a band of the pattern (i.e. the width as measured at the right end of the diameter OO' in FIG. 2). This makes is possible to average out the error over a plurality of scan cycles and greatly increase the accuracy of measurement, as will now be shown.

Let ε equal the said maximum width of an opaque or clear band (see FIG. 2). If the amplitude of the scanning movement is to be varied by the amount ε as just noted, the width 1 of the annular zone ZO must be taken at least equal to the scanning amplitude λ plus the width ε.

Assume now that the angle α is such that the scan line of one of the scanners is positioned within the angle indicated as β, where the maximum number of bands encountered over a transverse or radial scan movement is six, while such number would be seven to the left of the position considered, where the bands are wider and spaced further apart, and would be five to the right of that position where the bands are narrower and more closely spaced.

According to the feature being described, the scanning amplitude is so varied as to assume succesively, say eight different values differing by increments of ε/8, i.e., the values $$\lambda, \lambda+\frac{\epsilon}{8}, \lambda+\frac{2\epsilon}{8}, \cdots \lambda+\epsilon$$

During the first scan cycle, the scanner senses only five bands. The scanner only begins to sense six bands starting with a particular one of its eight scanning cycles of incrementally increasing amplitude, and this particular scanning cycle occurs earlier, as the angle α is closer to the leftward radial boundary of the angle β. In other words, the total number of pulses delivered by the scanner will be 8 times (or 16 times if two-way scanning movements are considered) the average value of the difference ($d_2-d_1$) representative of the actual position of α within the angular range β, such value being within the range from 5 to 6 in the example considered. Consequently, the mean accuracy of measurement of the angle α is improved by the factor 8, i.e. is now only $$\frac{9}{8}=1° \ 7'$$

rather than 9°.

In a modification of this feature of the invention, the amplitude of the scan cycyle is kept constant but the origin of the scan cycle is incrementally and cyclically altered, the total variation introduced being again equal to about one maximum band width. This has the advantage of eliminating the small cyclic changes in scale factor that are introduced if the scan amplitude is varied as described above. When on the other hand the cycle origin, rather than the cycle amplitude, is cyclically modified as now being described, the total number representative of the angular function being generated, instead of cyclically changing between a maximum and a minimum value, as in the modification last described, is varied between two digital values differing by only one unit. In this case, it is the frequency with which said number assumes the higher (or lower) of such two digital values, that is representative of the precise location of the scan line with respect to one (or the other) of the two radial boundaries of the angle β.

Provided the quantity V (determining the number of rotation of the scanner drive shaft F) is great enough, the accuracy of the measurement attainable when either of the two features just described is used, i.e. when either the amplitude or the origin of the scan cycle is cyclically varied, can be yet further improved by introducing an additional long-term variation in the position of the origin of the scan cycle about an average central position. The resulting indication provided by the counter then constitutes the mean of a large number of relatively crude approximations of the true value of the function, with the errors by default and errors by excess being averaged out, so that the final reading represents the true value of the function with great precision. This is true both when the angle α retains a fixed value and when said angle varies erratically. Practical mechanism for achieving this cyclic long-term variation of the scan origin will be described later with particular reference to FIG. 5.

A practical embodiment of a computer device according to the invention will now be described with reference to FIGS. 4 to 10, this particular embodiment being in the nature of a guidance device designed to be mounted aboard a land vehicle, for continually indicating the positional coordinates and the angular bearing of the vehicle.

The computer mechanism is enclosed in a generally cylindrical housing. The top of this cylindrical housing (see FIG. 4) has a transparent glass cover plate 36 mounted by means of a bezel arrangement including three superposed annular cover ring members 35a, 35b and 35c, the lowermost ring 35a being secured to the top end of the cylindrical wall member 34 of the housing. A circular dial disk 5 is supported below the transparent window 36 by having its periphery inserted between the cover rings 35a and 35b.

The cylindrical housing includes a lower section comprising a thickened cylindrical wall 33b having its top suitably secured to the lower end of the cylindrical wall 34. The lower end of said base section comprises a flat base wall 37 secured across the lower end of cylindrical wall 33b, said wall 37 constituting the bottom of the entire housing.

A horizontal partition wall 33a integral with the wall 33b extends across the lower housing section some distance above the bottom wall 37 of the housing.

The housing sections mentioned above are interassembled by the means best shown in FIG. 10, and comprising four spacer post assemblies such as 38 in vertical alignment along the vertical dimension of the cylindrical housing. As shown in FIG. 7, there may be provided four spacer post assemblies 38 disposed around the circumference of the cylindrical housing at the corners of a rectangle. The four aligned spacer posts in each of the four assemblies are interconnected with one another and with the housing sections by means of aligned screws. Thus, as shown in FIG. 10, there is a lowermost screw 39 which serves to secure the base wall 37 of the housing with a lowermost one of the post members, and to the horizontal cross wall 33a. An uppermost screw 40 extends downward from the top of the assembly to secure in place the cover assembly including the three bezel ring members mentioned above and the uppermost post member 38. Intermediate screwed portions, aligned with the screws 39 and 40, serve to position the intermediate two spacer posts and also serve to assemble the intermediate horizontal X-shaped supporting plates 41 and 42 in vertically spaced relation between the wall 33a and the top cover assembly.

The plate 41 serves to support a cylindrical casing 43 containing a conventional synchro receiver unit generally designated 3 which may be of any suitable well-known construction having a low-torque characteristic. Projecting from the upper end of casing 43 is an output shaft 2 of the synchro-receiver, which as shown in FIG. 4 is disposed along the vertical center axis of the cylindrical housing. The output shaft 2 extends rotatably through a central aperture in the dial 5, and has secured to its upper end a pointer 4 which is movable above the dial. As will presently appear, the pointer 4 cooperating with the dial 5 indicates at all times the bearing of the vehicle.

Also secured for rotation with the synchro output shaft 2 by means of a bell-shaped support clearly visible in FIG. 4 which rotatably embraces the upper part of synchro casing 43, is a pattern disk H, which is generally similar to the disk H shown in FIG. 3 and carries a pattern of nested opaque and clear bands of the kind described with reference to FIG. 2.

The synchro-receiver 3 is connected to a remotely positioned synchro transmitter, not shown, which may be operated from any suitable directional reference such as a conventional compass, or Earth-inductor, a directional gyro, or the like to provide a conventional directional follow-up loop well known to those familiar with the vehicle guidance art. To provide this connection, input conductors 9 are led out from the bottom center of the synchro-receiver unit 3 and through an axial tube 43a connected with synchro casing 43, the conductors 9 leading to a suitable connector 8 secured in the basewall of the housing as shown in FIG. 4.

Means are provided for manually presetting the angular output of the synchro-receiver 3 for initial adjusting purposes. As shown, for this purpose the body of the synchro unit 3 is formed with a peripheral gear annulus 46 which meshes with an intermediate gear 45 suitably supported for rotation on a vertical axis. Gear 45 meshes with a pinion 44 (see FIG. 6) secured at the lower end of a vertical shaft 44a which extends rotatably through aligned holes in the cover rings 35a–35c and carries a manual presetting knob 6 at its upper end. Said shaft 44a is further journalled near its lower end above pinion 44 in a flange 42b which forms part of the supporting plate 42 previously referred to.

The said supporting plate 42 has a generally X-shaped form best visible in FIG. 8, with the four legs of the X being secured to the four spacer post assemblies 38 in the manner already described. Further, one leg (the upper-right leg in FIG. 8) of the X-shaped plate is of extended width and is connected in a similar manner with an auxiliary spacer post assembly 38a. This extended leg 42a of the X-shaped plate is bent upwardly in the form of a U to provide the afore-mentioned flange 42b serving to support the presetting shaft 44a.

It will be understood that in the embodiment of the invention now being described, the angle α earlier referred to as defining the orientation of the master pattern disk H constitutes the directional bearing of the vehicle, and is introduced into the system as the rotational angle of the synchro-receiver output shaft 2, as described above.

The scalar quantity v, or the vector length V, which constitutes the second input factor of the system, is in this case the distance covered by the vehicle. This factor is introduced as the rotation of a shaft F (FIG. 5) driven from a tachometer take-off of the vehicle by way of a flexible cable drive generally designated 10 through a reducer unit 11. Shaft F, not visible in FIG. 4, will be understood to project from the top of unit 11.

In accordance with earlier disclosure there are provided two pairs of photoelectric scanning elements, reciprocated in two mutually orthogonal directions for computing the projections of the distance vector V along two orthogonal coordinate axes. The two pairs of scanner elements, later described, are in the form of the two rectangular slides 22 and 23 (see FIGS. 7 and 4). Slide 22 comprises two parallel spaced horizontal flanges 22a and 22b interconnected by transverse end walls having pairs of aligned holes therein for slidable mounting on a first pair of spaced guide rods or rails g, one of which is designated 16. The other slide 23 comprises a single flat plate having end flanges with pairs of aligned holes therein for slidable mounting a second pair of spaced guide rods g, the slide 23 being movable in the space defined between the upper part 22b of slide 22, and the supporting plate 41.

Means are provided for reciprocating the slide 22 from the drive shaft F, and for synchronously reciprocating the slide 23 from the slide 22. For reciprocating the slide 22, there is provided an auxiliary slide 12 which is reciprocable in a direction parallel to slide 22 on a pair of guide rods 15 and 16, guide rod 16 being one of the two guide rods g serving to reciprocate the slide 22. Slide 12 has a transverse groove 13 formed therein in a direction transverse to its direction of reciprocation, and engaging this groove is the upwardly projecting crankpin M. Crankpin M, whose function corresponds to that of the similarly designated element in FIG. 3, is driven from the tachometer shaft F at the output of reducer 11 through means later described in detail.

Reciprocation of auxiliary slide 12 is transmited to slide 22 by way of a mechanism including a lever 18 having an intermediate point 21 thereof pivoted to a point of slide 22, having a slot at one of its ends for receiving a crankpin 17 projecting from auxiliary slide 12, and having its opposite end pivoted to a fixed, adjustable point of the housing structure by way of a longitudinal slot in the lever 18 receiving a stationary pivot 19 therein. Means are provided for adjusting the position of pivot 19 in order to vary the throw of lever 18 and thereby adjust the reciprocatory amplitude of slide 22 (and hence slide 23) for a given reciprocatory amplitude of auxiliary slide 12, thereby to adjust the scale of measurement as will be later apparent.

For adjusting the position of stationary pivot 19, said pivot 19 is carried on one side of a nut 14 (FIG. 4) which is threaded on a screwshaft 47 journalled in suitable bearings of the housing structure, and manually rotatable by means of an external scale adjusting knob 20. Nut 14 carrying the pivot 19 is prevented from rotation by means of a guide member 48 embracing the nut. Hence, rotation of scale adjusting knob 20 will cause a displacement of the stationary pivot 19 in a direction normal to the reciprocation of slides 12 and 22, thereby altering the transmission ratio from the former to the latter and altering the scale of measurement.

For transmitting the reciprocation from slide 22 to slide 23, the upper flange 22b of slide 22 is formed with a set of rack teeth 22c along one side edge thereof, meshing with a pinion 24 rotatable on a vertical pin journalled in support plate 41. Pinion 24 also meshes with a similar set of rack teeth 23a formed along a side edge of the perpendicular slide 23.

All of the guide rods g, 15 and 16 serving to guide the main slides 22 and 23 and auxiliary slide 12 in their reciprocatory movements have their ends secured to the cylindrical sidewall 33b of the lower housing section.

Each of the slides 22 and 23 carries a pair of photoelectric scanner units generally designated 25, for cooperation with the master pattern disk H, the general arrangement of the two pairs of units 25 being clearly apparent from FIG. 8.

Each unit 25 includes a vertical tube 31 upstanding from the slide 22 or 23 and containing a pair of light-condensing lenses 30 positioned below the disk H (see FIG. 1). A generally L-shaped bracket 26a has a vertical side attached to the outer surface of tube 31 and an inwardly projecting upper arm extending over the disk H and containing the photo-electric scanner proper, enclosed in a light-tight casing 26. Said scanner proper comprises a photo-resistive cell 27 positioned in the casing 26 in vertical alignment with the optical axis of the condenser lenses 30. The casing 26 is provided at its lower end with an opaque wall formed with a central boss 28 projecting to within a very short distance from the upper surface of disk H, said boss having formed through its central apex with an orifice 28a of a diameter somewhat less than the width of the narrowest opaque bands formed on the pattern disk. It is here noted that the pattern of opaque and clear lines upon disk H can be obtained by various precision techniques of generally conventional character, as by photographic reduction from a large-scale drawing, which may be obtained with a graph-plotter.

The electrical output from each photo-cell 27 is applied by way of suitable connections not shown to an associated electromagnetic relay generally designated 32, said relays being suitably mounted in the bottom of the cylindrical housing. It will be understood that each pair of the relays 32 associated with each slide 22 or 23 may serve to actuate a differential counter arrangement I similar to the one shown in FIG. 3, one such counter arrangement being associated with each of the reciprocatory slides 22 and 23. Alternatively, or in addition, the relays of each pair may serve to actuate respective impulse-motors which may be coupled through differential gearing to operate a stylus in a generally conventional graph plotting arrangement, whereby to plot the course of the vehicle on a suitable recording medium.

In the embodiment being described, means are provided for imparting long-term cyclic variations to the amplitude of the movement of both the slides 22 and 23, or in other words the points of reversal of the slide movement at the respective ends of each scanning stroke, for the purpose of increasing the accuracy of the measurement as earlier described in a general manner.

For this purpose there is provided the particular form of transmission gearing shown in detail in FIG. 5, from the output shaft F of the tachometer reducer unit 11, to the crankpin M engaging the groove 13 in the auxiliary slide 12.

As shown, said crankpin M is carried by way of an eccenter journalled in the extremity of a crank arm or lever L, supported at the outer end of tachometer reducer output shaft F (note that the showing in FIG. 5 is reversed, i.e. upside-down, from the showing of FIG. 4). The ec-center mounting the crankpin M has an eccentric throw corresponding to $\epsilon/2$, where $\epsilon$ is the quantity previously defined. Secured to the accentric bearing at the opposite side of crank arm L from the side carrying crankpin M (i.e. above said crank arm in FIG. 5) is a pinion P, which meshes with a gear Q freely rotatable on the shaft F. Secured to said shaft F adjacent gear Q is another gear W. Gears Q and W engage a pair of integral pinions T and U respectively, which are freely rotatable on a common stationary pivot J projecting from the reducer casing 11 and spaced from the shaft F.

The pinions T and U are selected with different numbers of teeth which are close to each other and prime with respect to each other. With this arrangement, it will be understood that the crankpin M will be caused to revolve slowly about its eccentric axis, thereby correspondingly altering the effective total throw of the crankpin M relative to the drive shaft F, and the movement amplitude of sliders 22 and 23. For example, matters can be so arranged that crankpin M is made to turn substantially one half revolution about its eccentric axis for every eight revolutions of shaft F, whereby the amplitude of the scanning cycle will be altered by an increment of about $\epsilon/8$ at each shaft revolution, in accordance with the example earlier described. It will also be understood that the relative numbers of teeth of the gears can be so selected that on completion of every cycle of eight revolutions of shaft F, the crankpin M is not returned to exactly the same position as it had at the start of that cycle, but is returned to a somewhat displaced position. Thus, an exactly similar configuration of the parts will be restored only after a large number of revoutions of shaft F, e.g. several hundred. The precise position of the scanning cycle is thus made to vary incrementally over a long-term cycle including several hundred scanning cycles, over which the errors in measurement due to the finite width of the opaque loops will be substantially averaged out and the over-all precision in the measurement will be correspondling improved, as already explained.

In a practical embodiment of the apparatus disclosed with reference to FIGS. 4–10, the tachometer drive 10 performs one revolution per meter of distance travelled by the vehicle. The reducer 11 had a reduction ratio of 1:160, so that the shaft F was rotated one revolution per 160 meters distance travelled. The pattern on disk H, generally similar to the one shown in FIG. 2, was such that the pitch of the opaque bands was exactly 1 millimeter in their most closely spaced region (to the left of the disk in FIG. 2), and exactly 5 millimeters where the bands were widest apart (to the right of the pattern). The scanning amplitude of the slides 22 and 23 was selected at an average value of 10 millimeters, said value varying over the range from 7.5 mm. to 12.5 mm. ($\epsilon = 5$ mm.) throughout the rotation of the crankpin M, every 8 shaft revolutions, as described above.

During a full reciprocation of the pair of scanner elements along the OO' line, i.e. in a direction parallel to the true direction of vehicle travel, the average numbers of pulses delivered by the respective photo-cells was $n_2 = 20$ and $n_1 = 4$ respectively, so that the differential counter indicated a count of 16. The counter was therefore so calibrated that each pulse corresponded to a length of 10 meters of vehicle travel projected on the corresponding coordinate axis, so that the reading given by the counter gave said projected distance directly in decameters (1 decameter = 10 meters).

Conveniently, each of the differential counters such as $r$ (FIG. 3) is provided with two dials for separately giving readings of the positive and negative counts therein. In these conditions, one counter will separately indicate distances travelled North and South from a selected starting point, and the other counter will separately indicate distances travelled East and West. The counters may be provided with manual adjusting means for presetting counts therein indicative of the coordinates of a selected point of origin. In that case single-dial counters may be used and will indicate the coordinates of the instant position of the vehicle.

If desired, the manual course-adjusting knob 6 may be used to preset a prescribed bearing as the coordinate axis for one of the counters instead of the North–South direction. In such case the corresponding counter will indicate the distance travelled by the vehicle in the prescribed direction, while the other counter will indicate off-course deviations of the vehicle right and or left from its prescribed course.

A further embodiment of the invention is partly illustrated in FIGS. 11 to 13. Referring to FIGS. 12 and 13, a circular baseplate has four posts 52A–52D upstanding from it at the apices of a square. Pivoted through means not shown on a vertical axis passing through the center O of the square is the pattern disk H carrying an annular pattern of opaque and transparent bands formed thereon.

Pivoted about the four posts 52A–52D are four scanner assemblies such as the assembly generally designated 53 in FIG. 13, and each including an upper casing section 53b overlying the disk H and containing the photoelectric cell element 64, and a lower casing section 53a underlying the disk H and containing a light source 60, condenser lens 61, reflector prism 62 and a focalizing lens 63 for emitting a sharp pencil of light upward through the disk H and into photocell 64.

Secured to the scanner assemblies 53A–53D at a certain spacing therebelow, for rotation with the respective assemblies about the pivot posts 52A–52D, are the respective lever members 51A–51D, herein shown as generally square plates which are pivoted about the posts 52A–52D at points positioned near an outer apex of each square, as shown. The four plate-levers 51A–51D are intercoupled by way of links 54, 55, 56, each having its opposite ends pivotally connected to a point of a related pair of adjacent plate-levers, as shown. It will be noted that the provision of only three links 54, 55, 56 is sufficient to intercouple all four plate levers 51A–51D for positive rotation simultaneously about their respective pivotal axes. Thus, if any one of said three links is longitudinally reciprocated, as by reciprocating a pin 57 projecting from the midpoint of link 54, in the longitudinal direction indicated by the double arrow 58, all four plate levers 51A–51D will have similar oscillatory movements imparted thereto about the pivots 52A–52D, and the scanner casing assemblies 53 secured to said plate levers will be similarly reciprocated in unison. In the schematic view of FIG. 11, the four scanner assemblies 53A–53D are indicated by dot-dash lines, and their oscillatory reciprocatory motions are indicated by the arcuate arrows 59A–59D. It will be noted that the oscillatory reciprocation of each scanner assembly is performed substantially radially with respect to the pattern disk H, and also that opposite scanner assemblies in each pair, such as 53A and 53C, or 53B and 53D, perform their reciprocating cycles in mutually reverse directions owing to the particular form of kinematic coupling means here used. This peculiarity does not alter the operation of the system in any essential.

Reciprocation is imparted to the crankpin 57 from a rotary shaft 65, generally corresponding to the shaft F earlier referred to, and which may be the output shaft of a tachometer drive reduction unit (not here shown) as in the embodiment of FIGS. 4–10.

The shaft 65 has a pinion 66 secured to its upper end, and a crankpin 67 projects from the upper side of said pinion in eccentric relation to shaft 65 (see FIG. 12). A link 68 has one end pivoted around crankpin 67 and its opposite end has a pin 69a fixedly projecting therefrom. Pin 69a is movable in an arcuate slot 70a formed in a lever 70 pivoted at its outer end on a pivot 80 supported in a manner presently described, and said lever 70 is forked at its inner end to engage with the crankpin 57 previously mentioned.

Pin 69a can be adjustably positioned in the slot 70a. For this purpose pin 69a is engaged by the forked end 71a of one arm of a two-armed lever 71 which is pivoted on a fixed pivot 72 at the junction of its two arms. The other arm of lever 72 is engaged on one side by the inner end of an adjusting screw 73 and is engaged on its other side by a spring 74.

Pinion 66 meshes with a gear 75 which in turn meshes with a gear 76, both said gears being rotatably supported below the baseplate of the system. Gear 76 has a crankpin 77 projecting upwardly therefrom in an eccentric position. Pin 77 engages a slot 78a formed in one arm of two-armed lever 78 pivoted on a fixed pivot 79 from the baseplate. The other arm of lever 78 supports the aforementioned pin 80 serving to pivot the lever 70 earlier referred to.

This system operates as follows. Assuming momentarily that pivot 80 is stationary, it will be apparent that every revolution of input shaft 65, acting by way of crankpin 67, link 68 and pin 69a, causes reciprocation of lever 70 about pivot 80, the crankpin 69a being freely slidable in the fork 71a. In this reciprocation of lever 70, the forked inner end 70b of the lever imparts reciprocation to crankpin 57 as indicated by the arrow 58 in FIG. 11, thereby imparting the coordinated opposite reciprocations to all four scanner assemblies as earlier described. The amplitude of this reciprocation depends on the position of pin 69a in the slot 70a. Adjustment of screw 73 acting through lever 71 in opposition to spring 74 modifies this position, and thereby modifies the reciprocation amplitude and hence the scale of measurement, as described with reference to lever 18 and pivot 19 in the embodiment of FIGS. 4–10. It will thus be seen that screw 73 is a scale adjusting screw corresponding to screw 20 in the previous embodiment.

The input shaft 65, acting by way of pinion 66 and gears 75 and 76, pin 77 and slot 78a, acts to impart reciprocatory oscillation to the bell-crank lever 78 about its fixed pivot. This causes a relatively slow reciprocatory movement of pivot 80 over a short arc 81 which is assimilable to a straight segment parallel to link 54. This movement of pivot 80, therefore, does not substantially modify the amplitude of reciprocation imparted by lever 70 to the drive pin 57, and the consequent reciprocation amplitude of the scanner assemblies. However, said slow reciprocation of pivot 80 does act to modify the origin of said scanning reciprocation on a long-term basis. The scanner assemblies therefore perform reciprocations of constant amplitude, but having their points of origin (or movement reversal) continually varied over a long-term cycle. If the gears 66 and 76 are selected with different numbers of teeth which are mutually prime numbers, the pins 67 and 80 will only resume any given relative position after the shaft 65 has completed a number of revolutions equal to the number of teeth of gear 76. There is thus provided a correspondingly large number of approximations in the measurement, above and below the true value thereof, so that errors tend to cancel out and yield a very high final precision as earlier explained. Assuming the disk 1 has not substantially changed its angular position throughout this period of approximation, the true measurement of the angular position (cos $\alpha$) is the mean of all the approximations. More broadly, if the angle $\alpha$ is everchanging, the error in the measurement, arising out of the digital or quantic character of the method employed in the invention, is substantially divided by the number of approximations.

A further embodiment of the invention is illustrated in FIGS. 14 to 16. This embodiment is particularly suitable for the automatic control of a machine-tool.

A casing 85 containing the principal components of the apparatus of the invention, as will be presently described, is supported for movement in a plane comprising the coordinate axes $Ox$ and $Oy$, while being constrained to retain a constant orientation with respect to said axes throughout its displacements. This is achieved by mounting casing 85 as follows.

Casing 85 has two spaced points 90 pivoted to the ends of a first pair of parallel links 88, having their opposite ends pivoted at 90' to a pair of aligned arms of a cross-member. The cross-member has its other pair of aligned arms, normal to the first, pivoted to the ends 91' of a second pair of parallel links 89, having their opposite ends pivoted at 91 to a fixed support. It will be clear that with this arrangement, the cross member 90'–91' is constrained to a constant orinetation in the plane $Oxy$, and hence the casing 85 is likewise constrained to this constant orientation, while having the requisite degrees of freedom to be translated to any position in said plane. Tension springs 92 and 93 are associated with the two parallel linkages to urge the casing 85 at all times leftward as here shown.

Projecting from the base of casing 85 and supported for rotation therein is a roller 94 which is urged, by the action of the afore-mentioned springs 92 and 93, into pressure contact with the contour of a pattern 95 which in the exemplary application referred to, represents the contour of a workpiece to be cut. The pattern contour 95 is made of or lined with ferro-magnetic material for reasons that will later appear. Roller 94 is driven in rotation through a worm and wormgear shown in FIG. 15, and through a reducer gear unit generally designated 97, from a motor 98 supported in the casing 85. Thus continuous rotation of the motor will cause the roller 94 to ride the pattern contour 95, e.g. in the direction shown by arrow 99, carrying the casing 85 with it.

A disk H carrying a pattern of dark and clear bands of the type earlier described, is secured on a shaft 100 which is journalled for rotation in lower and upper surfaces of the casing 85 by means of end pivots 101 and 102 preferably including inserts of wear-taking material. The shaft 100 is thus freely rotatable relative to casing 85, and means are provided for maintaining at all times the shaft 100 and the disk H secured thereto, in a predetermined orientation with reference to the tangent to the contour 95 with which the roller 94 is in instant engagement. As shown, for this purpose the shaft 100 has an arm 105 secured thereto, said arm having a bar magnet 106 secured to one of its ends, one pole of said magnet being rounded as shown at 106a and being supported at a distance from shaft 100 just shorter than the radius of the roller 94. It will thus be seen that the coaction of magnet 106 with the magnetic pattern contour 95 acts to hold the arm 105 at all times normal to the contour, as permitted by the low-friction pivots 101 and 102 of the shaft 100. To damp the rotational movements of shaft 100 and disk H in the casing, there is provided a suitable damper device schematically shown as a pair of vanes 103 projecting from the shaft 100 and enclosed in a fluid capacity 104 formed within casing 85.

Associated with the disk H are two pairs of photoelectric scanner elements, 86a–86b and 87a–87b, which are reciprocated from the motor 98 by using the mechanisms disclosed with reference to any of the embodiments heretofore described. As shown, the two pairs of scanner means are aligned in directions corresponding to the Ox and Oy axes of coordinates.

With this arrangement, it will be evident from earlier explanations that the electrical pulse outputs of the respective pairs of scanner elements represent at any time the projections of the travel of the roller 94 along the contour 95, upon the two coordinate axes. Said outputs from the scanners are applied by way of the respective pairs of lines 108 and 109 to respective differential devices, 110 and 111. As earlier described, each differential device 110 and 111 may comprise a pair of electromagnets or pulse motors, interconnected through differential gearing. The differential outputs of the respective differential gearings are shown as driving respective wormshafts 112 and 113 operating in a conventional manner the respective mutually orthogonal slides of the machine-tool, such as a milling cutter. The cutting head 114 of the machine-tool is thus displaced over a path which accurately tracks the contour 95. It will be noted that if the roller 94 is made to describe the contour 95 at a uniform velocity, the cutting tool will likewise follow its prescribed path over the workpiece at a corresponding uniform velocity.

A great many modifications, in addition to those already referred to in the specification, may be introduced within the scope of the invention. For example, instead of using a pattern of alternating opaque and transparent curves and photoelectric scanning means, a pattern comprising alternate curves of magnetic and nonmagnetic material may be used, associated with inductive scanners. Further, the flat disk may be replaced by a cylindrical drum having two sets of curves provided on opposite annular sections of its side surface, and the scanners may be reciprocated generally parallel to the axis of the drum.

Features of the various embodiments described and shown may be combined in various ways. Thus, an assembly similar to the assembly shown in FIG. 14 as connected to the scanner output conductors 108 and 109, may be used in the other embodiments described herein, as a hodograph for plotting the course of a vehicle, the element indicated as 114 in FIG. 14 in that case representing a stylus or the like.

What we claim is:

1. Apparatus for computing a function of the general form $y=vf(\alpha)$, where $v$ is a scalar quantity and $f(\alpha)$ a function of the angle $\alpha$, comprising:

a support mounted for angular displacement about an axis, said support carrying a pattern of curves of alternately different physical characteristics;

a pair of scanners responsive to one of said physical characteristics and mounted for simultaneous reciprocation relative to said support along a determined path in scanning relation with respective, spaced areas of said pattern, whereby each scanner will deliver an electric pulse at an output thereof in response to the sensing of a curve of the pattern;

means for reciprocating said scanners at a common rate representative of said scalar quantity;

said pattern of curves being so plotted that the difference between the numbers of said curves present in said respective spaced areas of the pattern along said determined scanning path is the said function $f(\alpha)$ of the angular position of the support as referred to said scanning path; and differential means having respective inputs connected to the outputs of said respective scanners and responsive to the numbers of pulses applied to said inputs for producing an output representative of the difference of said number of applied pulses, as a measure of the value of the function $y=vf(\alpha)$.

2. Apparatus according to claim 1, wherein said support has a flat surface and said pattern of curves is provided in an annular zone of said flat surface as a series of loops varying in number around the circumference of said annular zone, said scanning path is generally radial with respect to the annular zone, and said spaced pattern areas constitute generally diametrically opposed areas of the annular zone.

3. Apparatus according to claim 1, wherein the differential means comprise a differential gear train having two inputs and an output, and a pair of pulse motors electrically connected for energization by the outputs of the respective scanners and mechanically connected to drive respective inputs of the differential gear train, whereby the output of the differential gear train is rotated in response to the difference of the numbers of pulses delivered by the scanners.

4. Apparatus according to claim 3, including a reversible counter connected for operation by the output of the differential gear train.

5. Apparatus according to claim 3, including a displaceable member connected for displacement by the output of the differential gearing.

6. Apparatus according to claim 1, wherein said curves are alternately opaque and transparent and said scanners are photoelectric elements.

7. Apparatus according to claim 1, including means for cyclically varying the amplitude of reciprocation of the scanners over a number of reciprocating cycles.

8. Apparatus according to claim 1, including means for cyclically displacing the midpoint of the reciprocatory movement of the scanners over a number of reciprocatory cycles.

9. Apparatus according to claim 1, wherein the scanner reciprocating means comprise a rotatable shaft driven in a number of turns representative of said scaler quantity, and movement converting linkage connecting said shaft with both scanners for reciprocating the scanners.

10. Apparatus according to claim 9, comprising gearing driven from said rotatable shaft and connected with said linkage so as to vary cyclically the effective length of a part thereof for cyclically varying the reciprocation amplitude of said scanners.

11. Apparatus according to claim 9, comprising gearing driven from said rotatable shaft and connected with said linkage so as to vary cyclically the position of a part thereof for cyclically varying the midpoint of the reciprocation of each scanner.

12. Apparatus according to claim 10, wherein said gearing comprises a planetary gearing including planet gears having numbers of teeth that are close to each other and in prime relation with each other.

13. Apparatus according to claim 9, wherein said linkage includes a lever having a first point connected for reciprocation from said shaft, a second point connected to reciprocate the scanners, and a third point constituting a variable fulcrum, and gearing driven from the shaft and connected to displace said third point of the lever in accordance with a long-term cycle comprising a relatively large number of reciprocations of said first point of the lever.

14. Apparatus according to claim 13, wherein said gearing includes an input gear and an output gear with numbers of teeth that are in prime relationship to each other.

15. Apparatus according to claim 13, including means for adjusting the position of said first point of the lever.

16. Apparatus according to claim 9, wherein the scanners are carried by a common support having means for guiding the reciprocation of said support.

17. Apparatus according to claim 9, wherein the scanners are carried by separate supports mounted for pivotal reciprocation, and linkage is provided for coupling both supports for synchronous reciprocation.

18. Apparatus for computing functions of the form $x = v \cos \alpha$ and $y = v \sin \alpha$, where $v$ is a scalar quantity and $\alpha$ is an angle, comprising:
- a support mounted for angular displacement about an axis, said support having a pattern of curves of alternately different physical characteristics;
- a first pair of scanners responsive to one of said physical characteristics and mounted for simultaneous reciprocation relative to said support along a first path in scanning relation with respective spaced regions of said pattern;
- a second pair of scanners responsive to said one physical characteristic and mounted for simultaneous similar reciprocation relative to said support along a second path generally orthogonal to said first path and in scanning relation with further spaced areas of said pattern;
- whereby each scanner will deliver an electric pulse at an output thereof in response to the sensing of a curve of the pattern;
- means for reciprocating all said scanners at a common rate representative of said sealer quantity $v$;
- said pattern of curves being so plotted that the difference between the numbers of said curves present in said respective spaced areas of the pattern along either of said scanning paths is a sinusoidal function of the angular position of the support as referred to said scanning path; and
- first and second differential means each having respective inputs connected to the outputs of the respective scanners of an associated one of said first and second pairs, and each responsive to the numbers of pulses applied to its said inputs for producing an output representative of the difference of said number of applied pulses.

19. Apparatus according to claim 18, including a common movable output member, first and second drive means for imparting separate components of movement to said member in directions parallel to said axes, and means operating said drive means from the outputs of respectively associated ones of said differential means.

20. Apparatus according to claim 18, which is installed as a navigational instrument aboard a vehicle, and including directional means for maintaining said support in a prescribed orientation with reference to coordinates external to the vehicle and means for varying the rate of reciprocation of said scanners in proportion to the velocity of the vehicle.

21. Apparatus according to claim 20, wherein said support is connected for rotation with a synchro receiver unit connected in a directional follow-up circuit with a synchro transmitter rotatable in dependency on a directional reference instrument.

22. Apparatus according to claim 20, wherein the means for varying the rate of reciprocation of the scanners comprises a shaft connected for rotation from a tachometer drive of the vehicle.

23. Apparatus according to claim 18, which is mounted for movement along a prescribed contour to be tracked, and including means supporting said scanners so that their reciprocation paths are maintained parallel to fixed directions and means for maintaining said support in a fixed angular orientation with respect to the tangent to the contour during said displacement thereof along the contour.

References Cited
UNITED STATES PATENTS

| | | | |
|---|---|---|---|
| 2,746,303 | 5/1956 | Pollock | 235—61 |
| 2,759,687 | 7/1956 | Brandon | 235—61 |
| 3,037,203 | 5/1962 | Woods | 235—186 X |
| 3,147,374 | 9/1964 | Diamond | 235—189 |
| 3,152,261 | 10/1964 | Carlstein | 235—189 |

FOREIGN PATENTS 1,199,510  8/1965  Germany.

RICHARD B. WILKINSON, *Primary Examiner.*

L. R. FRANKLIN, *Assistant Examiner.*